United States Patent [19]

Vier et al.

[11] Patent Number: 4,739,713

[45] Date of Patent: Apr. 26, 1988

[54] METHOD AND APPARATUS FOR REDUCING THE $NO_x$ CONTENT OF FLUE GAS IN COAL-DUST-FIRED COMBUSTION SYSTEMS

[75] Inventors: Fritz Vier, Monheim; Heinz Baumgart, Langenfeld; Dietrich Wiese, Hille; Robert Michalke, Duisburg, all of Fed. Rep. of Germany

[73] Assignee: Henkel Kommanditgesellschaft auf Aktien, Duesseldorf, Fed. Rep. of Germany

[21] Appl. No.: 67,517

[22] Filed: Jun. 26, 1987

[30] Foreign Application Priority Data

Jun. 26, 1986 [DE] Fed. Rep. of Germany ....... 3621347

[51] Int. Cl.⁴ .............................................. F23D 1/00
[52] U.S. Cl. ..................... 110/263; 110/204; 110/345; 110/347; 431/10
[58] Field of Search ............... 110/347, 345, 263, 264, 110/204; 431/8, 10

[56] References Cited

U.S. PATENT DOCUMENTS

| | | | |
|---|---|---|---|
| 4,144,017 | 3/1979 | Barsin et al. ........................... | 431/10 |
| 4,294,178 | 10/1981 | Borio et al. ........................... | 110/347 |
| 4,403,941 | 9/1983 | Okiura et al. ........................... | 431/10 |
| 4,438,709 | 3/1984 | Borio et al. ........................... | 110/347 |
| 4,511,325 | 4/1985 | Voorheis ............................... | 431/10 |
| 4,669,398 | 6/1987 | Takahashi et al. ................... | 110/347 |
| 4,669,399 | 6/1987 | Martin et al. ......................... | 110/347 |
| 4,699,071 | 10/1987 | Vier et al. ............................. | 110/345 |

*Primary Examiner*—Edward G. Favors
*Attorney, Agent, or Firm*—Ernest G. Szoke; Henry E. Millson, Jr.

[57] ABSTRACT

A method for reducing the $NO_x$ content of effluent gas in a coal-dust-fired combustion system comprising establishing at least two vertically adjacent burner planes, in which the burner flame cores are fed with primary air in the core zones in a substoichiometric ratio to the coal dust feed stream and are additionally fed with secondary air comprising recycled flue gas in optional combination with preheated fresh air, and in which the burner mantle zones are fed with tertiary air comprising recycle flue gas and optional fresh air, so that, overall, a substantially stoichiometric combustion air ratio is established in the region of the lower burner plane and, overall, a highly substoichiometric combustion air ratio is established in the region of the upper burner plane. The apparatus employed is an economical primary measure requiring little space and minimal loss of energy, and is easily retrofitted in existing plants.

36 Claims, 2 Drawing Sheets

METHOD AND APPARATUS FOR REDUCING THE NO$_x$ CONTENT OF FLUE GAS IN COAL-DUST-FIRED COMBUSTION SYSTEMS

BACKGROUND OF THE INVENTION

1. Field of the Invention

This invention relates to a method and apparatus for reducing the NO$_x$-content of flue gas in the burning of coal dust in coal-dust-fired combustion systems. The invention is particularly applicable to steam generating plants and plants wherein dry ash removal is practiced.

The excessive NO$_x$-content of flue gas from the burning of fossil fuels is an acute environmental problem, and attempts are being made to reduce these emissions. In the Federal Republic of Germany, for example, legislation on large firing plants using coal-dust-fired steam generators with dry ash removal stipulates a maximum NO$_x$-value of 650 mg/m$^3$ for power station heat outputs of up to 300 MW and an NO$_x$- value of 200 mg/m$^3$ for outputs exceeding 300 MW.

Most old plants have NO$_x$ emission levels which exceed these values. This is in part attributable to the fact that in the interests of economy old plants are typically equipped with air preheaters for exchanging flue gas heat with combustion air to at least partially recycle the energy used in the combustion process. However, the burning of fossil fuels with air preheated to around 300° C. results in the formation of very large quantities of NO$_x$ if conventional burners are used.

In principle, a reduction in the NO$_x$ content of the off-gas (effluent) stream entering the environment is obtainable by direct measures applied to the firing system, generally termed "primary measures", or by flue-gas cleaning plants, generally termed "secondary measures". The present invention is directed to a primary control measure, well adapted for economical retrofitting of existing coal-fired combustion systems.

2. Discussion of Related Art

In contrast to gas-fired systems, in which NO$_x$ is formed primarily by oxidation of the nitrogen in the air (thermal NO$_x$), up to 60% of the NO$_x$-emission of a coal-dust-fired system is derived from nitrogen in the fuel itself ("in-fuel" nitrogen).

In order to suppress the formation of NO$_x$ from in-fuel nitrogen, sub-stoichiometric quantities of combustion air have previously been employed in the burning of coal dust. One of the disadvantage of such a sub-stoichiometric approach is in the greatly increased formation of CO, which considerably increases the risk of CO corrosion damage to the boiler or fire box walls, and which is itself an environmental pollutant. It is also known that NO$_x$ is decomposed in the presence of gas constituents such as CO, H$_2$, or hydrocarbons.

It is accordingly desirable to provide a method for reducing the NO$_x$ content of an off-gas stream of a coal-dust fired combustion system through primary means which occupy relatively little space, involve only a minimal loss of efficiency, and by which existing plants can be inexpensively retrofitted.

DESCRIPTION OF THE INVENTION

Figure 1:
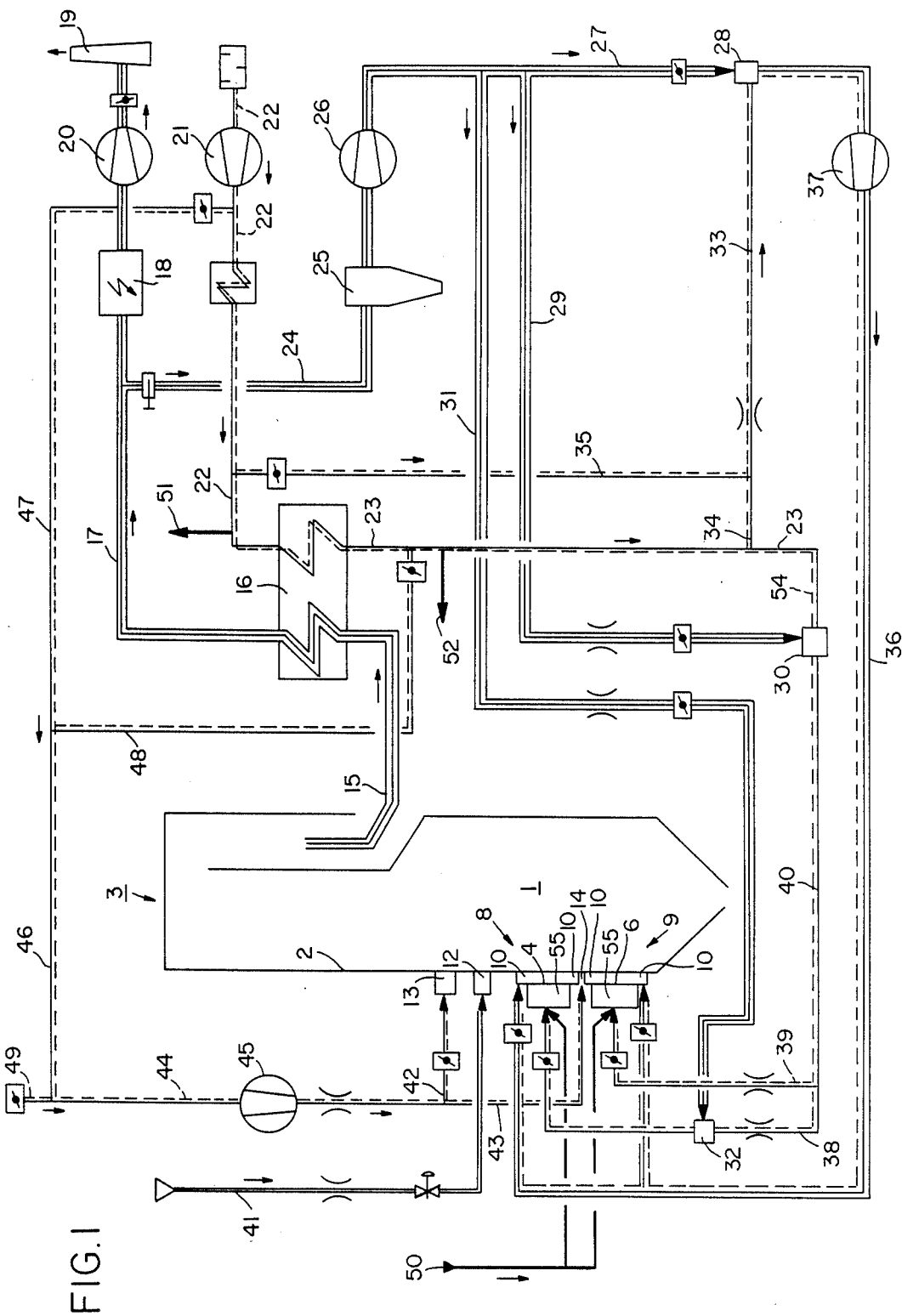
FIG. 1 is a diagrammatic representation of the process of the invention applied to a steam generating plant.

According to the invention, the flame cores of burners associated with a coal-dust-fired combustion system and disposed in at least two vertically adjacent burner planes are fed with primary (atmospheric) air in the burner core zones in a substoichiometric combustion ratio to a coal dust feed stream. Recycled flue gas, in combination with atmospheric air as required, is additionally fed to the burner core zones as secondary air and to the burner mantle zones as tertiary air to establish an overall substantially stoichiometric combustion air to feed gas ratio in the region of the lower burner plane and an overall highly substoichiometric combustion air to feed gas ratio in the region of the upper burner plane. The mix of gases in the feedstreams and temperatures thereof are controlled to minimize NO$_x$ content in the off-gas from the combustion system. Particularly advantageous combustion and reduction conditions are obtained according to the invention when an overall combustion air to coal feed ratio $\gamma$ of 0.9 to 1.1:1, especially 1.0:1, is established in the lower burner plane, and an overall combustion air to coal feed ratio of 0.5 to 0.8:1, especially 0.6:1, is established in the upper burner plane; preferably, a similar substoichiometric combustion air to coal feed ratio is established in each burner core zone.

By virtue of the invention, it is possible to establish such a low NO$_x$ content in the effluent stream issuing into the environment that stringent environmental controls such as the limits stipulated in the legislation on large-firing combustion plants discussed supra are achievable through the primary measures according to the invention, in many instances without further treatment of the effluent stream. The method according to the invention is particularly adapted for application to existing combustion systems as it comprises structurally simple modifications which occupy relatively little space (are compact), does not involve any serious loss of efficiency with the relatively small amount of recycled flue gas employed (does not waste energy) and is retrofitted to existing plants with relatively little capital investment (is relatively economical).

DETAILED DESCRIPTION OF THE INVENTION

Other than in the operating examples, or where otherwise indicated, all numbers expressing quantities of ingredients or reaction conditions used herein are to be understood as modified in all instances by the term "about".

According to the invention, a low NO$_x$ content of flue gas from a coal-dust-fired boiler is achieved by a combination of steps establishing different combustion air to feed gas ratios in different zones of the burner. Firstly, the result of the substoichiometric ratio of combustion air to coal feed in the flame cores in the burner core zones and the secondary air additionally introduced (recycled flue gas, optionally in admixture with preheated atmospheric air) is that relatively little thermal NO$_x$ is formed in the burner core zones. For post-combustion, tertiary air (a mixture of recycled flue gas and atmospheric air) is then fed to the burner mantle zones so that delayed post-combustion is obtained at a relatively low flame temperature through the recycled flue gas. Generally, cold flue gas is employed in conjunction with either cold or pre-heated atmospheric air to obtain gases at the desired combustion temperature. In the context of the present invention "cold" air refers to atmospheric (fresh) air at ambiant temperature, and "preheated" refers to atmospheric air above ambiant temperature, while "cold" flue gas refers to flue gas cooled below formation temperatures, typically by dissipation of heat in a heat exchange unit which is a preheater for the fresh air. In addition to largely suppressing the formation of thermal $NO_x$ through the substoichiometric two-stage combustion regime at the low flame temperatures of the present invention, coal particles are also subjected to a pyrolysis and gasification reaction in which volatiles partly containing in-fuel nitrogen are released. These reaction products of the coal then enter into chemical reactions and generate atomic nitrogen. The atomic nitrogen thus formed encounters only a minimal oxygen supply in the burner planes so that only comparatively little $NO_x$ is formed from the in-fuel nitrogen.

Another effect of establishing different combustion air ratios in the upper and lower burner planes is that the feed stream of coal dust is burnt in two stages in each burner. Despite the relatively low flame temperatures preferably employed. $NO_x$ is inevitably formed through local temperature peaks in the lower burner planes; however, reducing pyrolysis constituents such as CO, $H_2$, and certain hydrocarbon radicals formed in the upper burner plane as a result of the overall highly substoichiometric reducing environment therein present function to reduce $NO_x$ molecules formed in the lower burner plane as they rise. Further, again owing to the reducing atmosphere in the upper burner plane, $NO_x$ formation in this region is minimized.

To support the reducing effect of the upper burner plane and to guarantee substantially complete post-combustion, in another embodiment of the invention a substantially reducing gas such as natural gas, is additionally introduced above the upper burner plane and another stream of atmospheric air, typically cold air, is injected into the fire box as top air above the reducing gas injection opening.

Another embodiment of the invention is characterized in that, for each burner plane, a different mixture of recycled cold flue gas and preheated atmospheric air is fed to the burner core zones as secondary air and, for each plane, the same mixture of recycled cold flue gas and atmospheric air is fed to the burner mantle zones as tertiary air, with the secondary air to the upper burner plane optionally consisting solely of recycled flue gas. This measure is particularly appropriate for adjusting the different combustion air ratios in the burner planes to minimize $NO_x$ effluent content. An advantageous flow of the flue gas in an application of this embodiment is obtained if a first partial stream of a recycle flue gas stream is fed to the burner mantle zones in each plane after addition of fresh air to form a tertiary air mixture; a second partial stream of the recycle flue gas is injected into a fresh air stream downstream of an air preheater to provide warmed secondary air for the burner core zones; and a third partial stream of the recycle flue gas is injected into the secondary air mixture (the second partial stream of recycled flue gas and fresh air) downstream of a branch in the secondary air conduit so that a different secondary air mixture is supplied to the lower and upper burner planes. In an advantageous variant of this embodiment, either cold fresh air branched off upstream of an air preheater and/or warm fresh air branched off downstream of an air preheater is added to the first partial stream of recycled flue gas to form the tertiary air mixture, because the temperature of this gas mixture to be fed in and, hence, ultimately the flame temperature in the burner zones, is readily controlled in this way. In a particular application of these embodiments, 15 to 30%, more especially 27%, of flue gas leaving the combustion zone is recycled; from 5 to 10%, more especially 8%, of the total flue gas is diverted as the first partial stream; from 5 to 15%, more especially 11%, of the total flue gas is diverted as the second partial stream; and from 5 to 10%, more especially 8%, of the total flue gas is diverted as the third partial stream. Preferably, the first partial stream is mixed with 15 to 25%, more especially 22%, of the total fresh air to be introduced into the system to form the tertiary air mixture, and the second partial stream is mixed with 30 to 40%, more especially 33%, of the total fresh air supply, to form the secondary air mixture, usually downstream of the air preheater. (All percentages are by volume.)

To provide a suitable transport medium for the coal dust and/or for feeding the coal dust to the burner planes, in another embodiment of the invention fresh air streams are diverted ahead of and behind air preheaters and are combined with the coal dust feed to the burner flame cores as primary air.

To obtain a good effect from reducing gas introduced above the burner planes and to inhibit CO corrosion of the fire box walls, in another advantageous embodiment of the invention, natural gas is injected at high velocity into the fire box housing the burners above the upper burner plane as reducing gas and a partial air stream branching off from an air stream to be injected as "top" air above the reducing gas injection opening is injected into the fire box as "film" air in the region of the upper burner plane. The effect of the method according to the invention on the reduction of $NO_x$ in the off-gas stream is enhanced with particular advantage if this film air is injected into the fire box from the front wall and all side walls of the fire box while the other media are introduced into the fire box solely through the front wall of the burner.

In another embodiment of the invention more than two vertically adjacent burner planes are present; preferably these burner planes are operationally interconnected to form lower and upper burner zones or two directly vertically adjacent burner planes are interconnected to form lower and upper burner planes, with the combustion air ratio $\gamma$ decreasing at least tendentially from a substantially stoichiometric value in the lower first burner plane towards the upper last burner plane. In this embodiment (i.e., when a plurality of more than two burner planes are present), the practice of the method of the invention can be controlled with greater precision by variation of the various fresh air/flue gas ratios, particularly in the secondary airstreams to the individual burner planes.

In an exemplary embodiment of the combustion system of the invention, a coal-fired steam generating plant is provided with a fire box having at least two vertically adjacent burner planes, a first fresh air conduit for tertiary air communicating with injection openings in the burner mantle zone, and a second fresh air conduit for secondary air communicating with injection openings in the burner core zones; recycle flue gas streams are injected into the fresh air streams to provide gas mixtures in the desired proportions to the burner zones.

Preferably, the second fresh air conduit communicates with the burner core zones of the lower burner plane downstream of the recycle gas introduction point and includes a branch communicating with injection openings in the burner core zones of the upper burner plane. To obtain a different gas mixture in the upper burner core zones, with a larger proportion of recycle flue gas, additional recycle gas is introduced into the branch conduit downstream of its junction with the main second fresh air conduit. It is frequently desirable to preheat the fresh air charged to the burner core zones. For efficient supply of air to the mantle zones, the associated injection openings conveniently comprise tuyeres concentrically arranged around each burner for the supply of tertiary air to the mantle zones of the burners.

In another advantageous embodiment, a branch pipe from a conduit carrying fresh air or preheated fresh air at least partly supplies atmospheric air to a conduit communicating with a source of coal dust and the burner core zones for supplying coal dust feed and primary air to these zones.

In another embodiment, the plant includes a conduit for reducing gas communicating with the interior of the fire box through injection openings above the upper burner plane, and a conduit for fresh air communicating with the interior of the fire box through injection openings above the reducing gas injection openings to supply "top" air to the firebox. As previously mentioned, it is additionally desirable to divert a portion of this top air to the area of the upper burner plane as "film" air. In one particularly advantageous embodiment, these injection openings for film fresh air are disposed in the side walls as well as the front wall of the fire box while the burners and injection openings for secondary and tertiary air, reducing gas, and top fresh air are arranged only in the firebox front wall.

Another advantageous embodiment of the plant according to the invention is characterized in that, to better enable the fire box temperature and the flue-gas chimney losses to be regulated, the various air conduits communicate with cold fresh air conduits and/or preheated fresh air conduits and the partial fresh air stream conduits communicate with preheated fresh air conduits and/or cold fresh air conduits.

To achieve substantially complete post-combustion, the tertiary air, top air and film air streams are preferably fed into the fire box under pressure, for example from about 20 to 30 psi. To this end, pressure-increasing blowers are conveniently arranged in the respective conducts carrying tertiary air, top air, and film air in another embodiment of the invention.

The combustion system according to the invention also preferably includes perforations disposed at the end of the film air conduits communicating with the interior of the fire box through the fire box side walls, which perforations serve as injection openings for this film air.

Embodiments of the invention are described in detail in the following, with reference to the accompanying Drawing.

Figure 2:
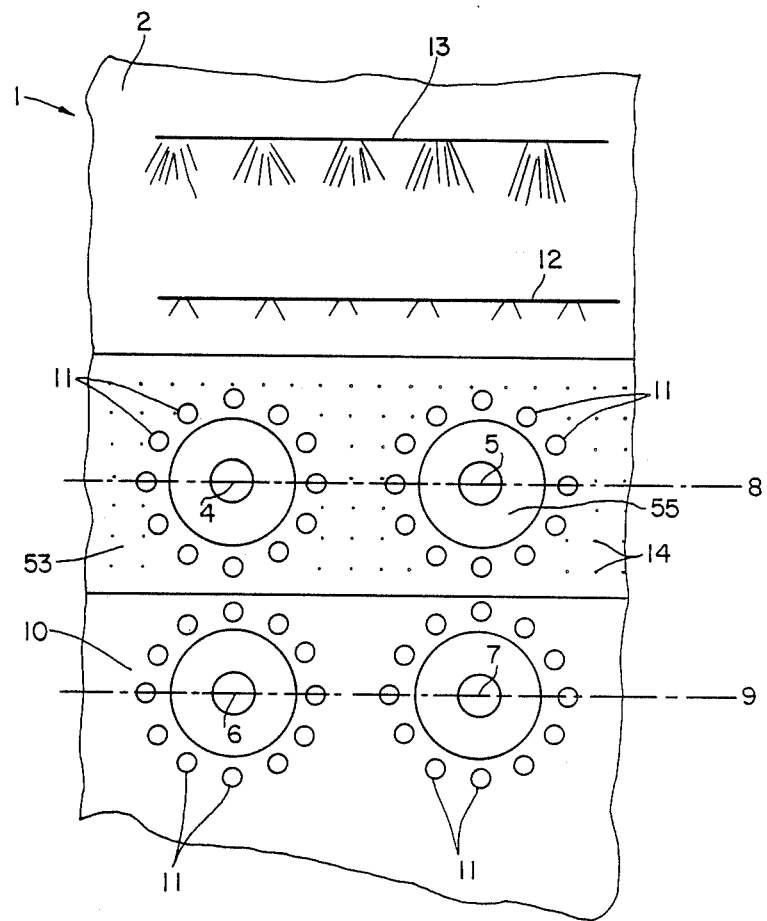
FIG. 2 is a partial front view of a firebox according to the invention associated with the plant of FIG. 1.

With particular reference to FIG. 2, the numeral 1 generally denotes a firebox including a vertically disposed burner front wall 2 horizontally divided into vertically adjacent burner planes comprising upper burner plane 8 including coal dust burners 4 and 5, and lower burner plane 9 including coal dust burners 6 and 7. Injection openings for supplying primary and secondary air and coal dust feed to the burner core zones 55; for supplying tertiary air to the burner mantle zones 10 (tuyeres 11 concentrically disposed around each burner 4, 5, 6, 7 in the burner front wall 2); for supplying reducing gas to the firebox 1 (reducing gas injection openings 12); for supplying top air to the firebox 1 (top air injection openings 13); and for supplying film air to the firebox (perforations 14); are disposed in the front wall 2 of firebox 1. Perforations 14 are disposed in the region of the upper burner plane 8 in the burner front wall 2 and also all around in the other fire box side walls at this level as a perforated belt. As best seen in FIG. 1, the firebox 1 is associated with a boiler generally indicated at 3, which may be a coal dust fired steam boiler with dry ash removal. On the exhaust side, the boiler 3 includes a flue-gas conduit 15 communicating with the boiler 3 which feeds flue gases through a heat exchanger (preheater) 16. From the preheater 16, the flue gases are fed through a conduit 17 communicating with conduit 15 to an electrostatic filter 18 and are then discharged into the atmosphere through a chimney 19 (the direction of flow of the particular medium is indicated throughout by small arrows). An induced draft 20 is disposed between the chimney 19 and the electrostatic filter 18.

Fresh air is admitted to the system via a main fresh air conduit 22, impelled by a fan 21 through the preheater 16 into a communicating conduit 23 carrying preheated fresh air.

In the exemplified embodiment, preheated fresh air is understood to be fresh air passed through the preheater 16 in order to take on heat. Cold fresh air, or cold air, is understood to be fresh air at ambiant temperature. Similarly, flue gas passed through the preheater 16 after is referred to as cold flue gas, after the dissipation of heat, while "flue gas" refers to flue gas either before or after it has passed through preheater 16.

A conduit 24, in which a dust separator 25 and a blower 26 are disposed, branches off from the flue gas conduit 17. Downstream of the fan 26, the conduit 24 branches into a conduit 27 for carrying a first partial stream of recycled flue gas, which communicates with a mixing chamber 28; the chamber 28 in turn communicates with the mantle zones 10 of burners 4, 5, 6, and 7 via conduit 36. A conduit 29 communicating with conduit 17 for a second partial stream of recycled flue gas communicates with a mixing chamber 30, which in turn communicates with the core zones 55 of burners 4, 5, 6 and 7 via conduits 38, 39 and 40. A conduit 31 communicating with conduit 17 for a third partial stream of recycled flue gas communicates with mixing chamber 32, which in turn communicates with burners 4 and 5 in the upper plane 8 of firebox 1.

A conduit 33 for a partial stream of fresh air communicates with the mixing chamber 28 and conduit 23 via conduit 34 for preheated fresh air and with the mixing chamber 28 and conduit 22 via conduit 35 for fresh cold air. The conduit 33 may be fed either only with preheated fresh air through conduit 34 or only with cold fresh air through conduit 35 or, where both conduits are open, with a mixture of preheated fresh air and cold fresh air.

From the mixing chamber 28, the gas mixture passes through the conduit 36 into the tuyeres 11 in the mantle zones 10 of the burners 4, 5, 6, 7, where this mixture is injected into the fire box 1 as tertiary air. A pressure-increasing blower 37 is preferably disposed in the conduit 36, for the injection of this gas mixture under pressure.

A partial flue-gas stream is combined in mixing chamber 30 with preheated fresh air via conduits 23 and 54: the resulting mixture is fed as secondary air to the core zones 55 of burners 4, 5, 6 and 7 via conduit 40, which branches into a conduit 38 communicating with the upper burner plane 8 and into a conduit 39 communicating with the lower burner plane 9. The amount of the flue gas fed to the conduits 38 and 39 is controlled by valve means (not shown) so that, if desired, the entire gas mixture passing through the conduit 40 is fed to conduit 39 and only a partial flue gas stream is fed to the conduit 38 through the conduit 31 via the mixing chamber 32 at the junction of the conduits 38 and 31.

The flue gas recycled in the conduits 24, 27, 29 and 31 as illustrated is cold flue gas because it is branched off from the flue gas conduit 17 downstream of the preheater 16.

Natural gas (reducing gas) is fed to the reducing gas injection openings 12 through a reducing gas conduit 41 communicating with a source of reducing gas (not shown). The quantity of natural gas injected here generally contributes up to about 10% by volume of the total quantity of fuel required for the heat output of the boiler.

The injection openings 13 and 14 are in communication with a conduit 44 via a fresh air conduit 42 and a fresh air conduit 43, respectively; a pressure-increasing blower 45 is disposed in conduit 44 for the injection of top air via openings 13 and for the injection of film air via perforations 14 into the interior of firebox 1. Upstream of the pressure-increasing blower 45, the conduit 44 communicates with a branch conduit 46 which is in communication with fresh air conduit 22 via conduit 47, and with preheated air conduit 23 via conduit 48. The supply of air into the conduit 46 is regulated so that either only cold fresh air from the fresh air conduit 22 is fed in through the conduit 47 or only preheated fresh air from the conduit 23 is fed in through the conduit 48, or a mixture of fresh air and preheated fresh air or no air at all is fed through conduit 46. In the latter case, the conduit 44 is supplied with air through a conduit 49, which is also in communication with a source of fresh air.

Coal dust and primary (fresh) air are fed to the core zones of the burners 4, 5, 6, 7 through a branching conduit 50, which is in communication with branch conduits 51 and 52, respectively communicating with conduit 22 for cold fresh air and the conduit 23 for preheated fresh air; these communicate with conduit 50 in a manner which is not shown in the drawing.

Perforations arranged as a belt 53 all around the upper burner plane 8 in the fire box 1 front and side walls of the boiler 3 comprise injection openings 14 through which a partial air stream is injected as film air through conduit 43 into the fire box 1. The partial view of the burner front wall 2 in FIG. 2 diagrammatically represents this arrangement for the region of the burner front wall. Commensurate with the air stream injected through the conduit 42 into the injection openings 13 into the fire box 1 as top air, the air stream injected into injection openings 14 through the conduit 43 is kept very small.

Additionally, FIG. 1 shows various regulating units, control elements and throughflow meters not denoted by reference numerals. These various elements are peripheral to the present invention, and will be supplied by those skilled in the art as occasion demands.

In the embodiment illustrated, a combustion air ratio $\gamma$ of 0.9 to 1.1 is preferably established in the lower burner plane and a combustion air ratio $\gamma$ of 0.5 to 0.8 in the upper burner plane, by corresponding adjustment of the fresh air/flue gas ratio carried in the respective feed conduits.

The embodiment described in the foregoing may of course be modified in various respects without departing from the basic concept of the invention. For example, the method described and illustrated may be applied not only to coal-dust-fired boiler plants with front firing, but also to boiler plants with corner or boxer firing. The top air and/or film air may be cold or preheated air, as is most advantageous. The method according to the invention is also applicable to melting chamber boilers. It is further possible depending on the construction and disposition of the electrostatic filter 18, for the branch conduit 24 to branch off between the chimney 19 and the induced draft 20, in which case the dust separator 25 may be superfluous.

We claim:

1. Primary emission control means for reducing the $NO_x$ content of flue off-gas obtained from the combustion of coal dust in a coal-dust fired combustion system comprising:
   (a) a fire box including a vertical wall horizontally divided into an upper burner plane and a lower burner plane, each of said burner planes including at least one burner for said coal having a burner core zone and a burner mantle zone;
   (b) first conduit means communicating between a source of primary air and coal dust and each burner core zone for conducting a coal dust feed stream and a primary air stream comprising atmospheric air to each burner core zone;
   (c) second conduit means communicating between a source of secondary air and the burner core zones for conducting a secondary air stream comprising recycle flue gas and optionally preheated atmospheric air to the burner core zones;
   (d) third conduit means communicating between a source of tertiary air and each burner mantle zone for conducting a tertiary air stream comprising recycle flue gas and optionally atmospheric air to each burner mantle zone;
   (e) first regulating means for regulating said streams to establish a substoichiometric ratio of combustion air to coal feed in the burner core zones;
   (f) second regulating means for regulating said streams to establish an overall stoichiometric ratio of combustion air to coal feed in the lower burner plane;
   (g) third regulating means for regulating said streams to establish a reducing atmosphere comprising an overall highly substoichiometric combustion air-to-feed ratio in the area of the upper burner plane;
   said regulating means functioning to regulate the temperature and composition of said streams so that two-stage combustion is provided in said burner wherein coal dust is primarily combusted in the region of the lower burner plane and $NO_x$ products of this combustion are reduced in the region of the upper burner plane, and wherein oxidation of in-fuel nitrogen is minimizied and production of thermal $NO_x$ is suppressed.

2. The primary emission control means of claim 1 wherein said fire box further includes reducing gas injection openings communicating with the interior of the firebox above said upper burner plane for admitting a reducing gas into said firebox.

3. The primary emission control means of claim 2, wherein said firebox further includes top air injection openings communicating with the interior of the firebox and disposed above said reducing gas injection openings for admitting atmospheric air into said firebox.

4. The primary emission control means of claim 1 further including tertiary air openings communicating with the burner mantle zones for admitting the tertiary air stream into the mantle zones comprising a plurality of tuyeres concentrically disposed around each burner core zone.

5. The primary emission means of claim 1, wherein said firebox includes side walls associated with a front wall comprising said vertical wall, and wherein said sidewalls include a plurality of film air injection openings communicating with the interior of the firebox in the upper burner plane for admitting atmospheric air into said firebox and said front wall includes injection openings for admitting film air, reducing gas, top air, and recycle flue gas, optionally in admixture with atmospheric air, as secondary and tertiary air into said fire box.

6. The primary emission means of claim 1, further including pressurization means for moving said streams through the respective conduits under pressure.

7. The primary emission means of claim 1, wherein the second conduit means communicates only between a source of secondary air and the burner core zones associated with the lower burner plane to conduct the secondary air stream to the lower burner plane burner core zones, and further including fourth conduit means communicating only between a source of secondary air and the burner core zones associated with the upper burner plane for conducting a different secondary air stream to the upper burner plane burner core zones.

8. The primary emission control means of claim 1, wherein said combustion system comprises a boiler for generating steam.

9. The primary emission control means of claim 8, wherein said boiler is a large-fired boiler.

10. The primary emission control means of claim 9, further including removal means for removing product combustion ash.

11. A process for reducing the $NO_x$ content of flue off-gas produced during the combustion of coal in a coal-dust fired combustion system comprising
(a) establishing a vertically planar burner region horizontally divided into an upper burner plane and a lower burner plane, said burner planes each including at least one burner for burning said coal dust and having a burner core zone and a burner mantle zone;
(b) feeding a coal dust stream and a primary air stream comprising atmospheric air to each of said burner core zones in a substoichiometric ratio of combustion air to coal feed;
(c) feeding a secondary air stream comprising recycle flue gas and optional preheated atmospheric air to each of said burner core zones;
(d) feeding a tertiary air stream comprising recycle flue gas and optional atmospheric air to each of said burner mantle zones;
(e) regulating the proportions of said feed streams to provide a substantially stoichiometric ratio of combustion air to coal feed in the lower burner plane and to provide a reducing atmosphere comprising a highly substoichiometric ratio of combustion air to coal feed in the upper burner plane;
(f) burning the coal in a two-stage combustion sequence in each burner wherein $NO_x$ products of combustion formed in the lower burner plane, are reduced in the upper burner plane, and wherein oxidation of in-fuel nitrogen is minimized.

12. The process of claim 11, wherein the temperature of the feedstream gases is regulated to provide a low flame temperature in at least the burner mantle zones to further suppress formation of $NO_x$.

13. The process of claim 11, wherein the reducing atmosphere provided in the upper burner plane is supplemented by the introduction of a reducing gas stream above the upper burner plane.

14. The process of claim 13, wherein a fourth airstream comprising atmospheric air is introduced as top air above the reducing gas stream.

15. The process of claim 14, wherein the fourth airstream comprises cold atmospheric air.

16. The process of claim 11, wherein said secondary air comprises a recycle flue gas or mixture of recycle flue gas and preheated atmospheric air and said tertiary air comprises a mixture of recycle flue gas and atmospheric air.

17. The process of claim 16, wherein first and second different secondary air mixtures are fed to the lower and upper burner planes, respectively, and the same tertiary air mixtures are fed to the upper and lower burner planes.

18. The process of claim 16, wherein the secondary air solely comprises cold recycle flue gas.

19. The process of claim 16, wherein said tertiary air comprises a mixture of cold recycle flue gas and preheated atmospheric air.

20. The process of claim 16, wherein said tertiary air comprises a mixture of cold recycle flue gas and cold atmospheric air.

21. The process of claim 15, wherein the secondary air comprises a mixture of cold recycle flue gas and preheated atmospheric air.

22. The process of claim 20, wherein said secondary air comprises a mixture of cold recycle flue gas and preheated atmospheric air.

23. The process of claim 17, wherein from about 15 to 30% of the product flue gas is recycled; and wherein the tertiary mixture comprises from about 5 to 10% of the product flue gas; the first different secondary air mixture comprises from about 5 to 15% of the product flue gas; and the second different secondary air mixture comprises from about 10 to 25% of the product flue gas, all percentages based on volume of flue gas.

24. The process of claim 23, wherein the tertiary mixture comprises about 8% of the product flue gas, and the first and second secondary air mixtures comprise about 8% and 22% of the product flue gas, respectively.

25. The process of claim 24, wherein both the first and second secondary air mixtures comprise preheated atmospheric air.

26. The process of claim 24, wherein, out of the total atmospheric air used in the two-stage combustion, from about 15 to 25 percent by volume is present in the tertiary air mixture and from about 30 to 40 percent by volume is present in the first and second secondary air mixtures.

27. The process of claim 26, wherein about 22% of the atmospheric air is present in the tertiary air mixture, and about 33% is present in the first and second secondary air mixtures.

28. The process of claim 11, wherein the primary air comprises preheated atmospheric air.

29. The process of claim 14, wherein the reducing gas is natural gas introduced under pressure and a part of the fourth airstream is diverted as film air to the upper burner plane.

30. The process of claim 29, wherein the fourth airstream is preheated either before or after diversion of the film air.

31. The process of claim 14, wherein the top air is cold air.

32. The process of claim 11, wherein each burner plane includes at least two burners in vertical relationship.

33. The process of claim 32, wherein each burner plane includes at least two burners in horizontal relationship.

34. The process of claim 32, wherein the combustion air to coal feed ratio decreases at least tendentially from a substantially stoichiometric ratio in the lower burner plane to a highly substoichiometric ratio in the upper burner plane.

35. The process of claim 11, wherein a combustion air to coal feed ratio of from about 0.9 to 1.1:1 is established in the lower burner plane and a combustion air to coal feed ratio of from about 0.5 to 0.8:1 is established in the upper burner plane.

36. The process of claim 27, wherein the combustion air to coal feed ratios in the lower and upper burner planes, respectively, are about 1.0:1 and 0.6:1.

* * * * *